(12) United States Patent
    Kuo (10) Patent No.: US 9,541,253 B2
(45) Date of Patent: Jan. 10, 2017

(54) LED STREET LAMP

(71) Applicant: HON HAI PRECISION INDUSTRY CO., LTD., New Taipei (TW)

(72) Inventor: Shien-Cheng Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 245 days.

(21) Appl. No.: 14/509,480

(22) Filed: Oct. 8, 2014

(65) Prior Publication Data

US 2015/0153033 A1 Jun. 4, 2015

(30) Foreign Application Priority Data

Nov. 30, 2013 (CN) .......................... 2013 1 0622203

(51) Int. Cl.
| | |
|---|---|
| *F21V 3/00* | (2015.01) |
| *F21V 1/00* | (2006.01) |
| *F21K 99/00* | (2016.01) |
| *F21V 29/00* | (2015.01) |
| *F21S 8/08* | (2006.01) |
| *F21V 5/00* | (2015.01) |
| *F21V 29/80* | (2015.01) |
| *F21V 29/87* | (2015.01) |
| *F21V 29/85* | (2015.01) |
| *F21W 131/103* | (2006.01) |
| *F21Y 105/00* | (2016.01) |
| *F21Y 101/00* | (2016.01) |

(52) U.S. Cl.
CPC . *F21V 1/00* (2013.01); *F21K 9/00* (2013.01); *F21S 8/08* (2013.01); *F21V 5/007* (2013.01); *F21V 29/002* (2013.01); *F21V 29/80* (2015.01); *F21V 29/85* (2015.01); *F21V 29/87* (2015.01); *F21W 2131/103* (2013.01); *F21Y 2101/00* (2013.01); *F21Y 2105/00* (2013.01); *F21Y 2105/10* (2016.08); *F21Y 2115/10* (2016.08); *Y02B 20/72* (2013.01)

(58) Field of Classification Search
CPC ........... F21V 29/002; F21V 29/80; F21K 9/00
See application file for complete search history.

(56) References Cited

U.S. PATENT DOCUMENTS

| | | | |
|---|---|---|---|
| 7,766,510 B2* | 8/2010 | Lee ....................... | F21S 48/328 362/249.02 |
| 2009/0257224 A1* | 10/2009 | Huang .................. | F21V 19/001 362/235 |

(Continued)

FOREIGN PATENT DOCUMENTS

| | | |
|---|---|---|
| CN | 101765627 A | 6/2010 |
| CN | 201599769 U | 10/2010 |

(Continued)

*Primary Examiner* — Evan Dzierzynski
(74) *Attorney, Agent, or Firm* — Zhigang Ma (57) ABSTRACT

LED light sources utilized in a street lamp include a base seat, a lamp shade mounted on the base seat, and a top housing coupled with the base seat. The base seat includes a plurality of first heat dissipation columns integrated with the base seat. The lamp shade includes a plurality of the LED light sources. The top housing includes a plurality of second heat dissipation columns integrated with the top housing. The base seat, the first heat dissipation columns, the top housing, and the second heat dissipation columns are made of a polyamide resin containing a graphite powder.

15 Claims, 8 Drawing Sheets

(56) References Cited

U.S. PATENT DOCUMENTS

2012/0092879 A1* 4/2012 Chang .................. F21V 17/164
362/374
2015/0138769 A1* 5/2015 Chen ........................ F21K 9/00
362/240

FOREIGN PATENT DOCUMENTS

| CN | 101893192 A | 11/2010 |
| CN | 201851973 U | 6/2011 |
| CN | 102563464 A | 7/2012 |
| CN | 202338862 U | 7/2012 |

* cited by examiner

LED STREET LAMP

FIELD

The subject matter herein generally relates to light emitting diodes (LEDs).

BACKGROUND

Recently, LEDs have been employed as a light source in outdoor lighting devices, (e.g., street lights). Heat dissipation is an issue to be addressed in the manufacturing of an LED street light. A heat dissipating structure can be positioned below the LED module in an LED street light to avoid a reduction in length of service life of the LED module by overheating.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "inside" indicates that at least a portion of a region is partially contained within a boundary formed by the object. The term "substantially" is defined to be essentially conforming to the particular dimension, shape, or other feature that is modified by the word "substantially", such that the feature of the component need not be exact. For example, "substantially cylindrical" means that the object resembles a cylinder, but can have one or more deviations from a true cylinder. The term "comprising", when utilized, means "including, but not necessarily limited to"; it specifically indicates open-ended inclusion or membership in the so-described combination, group, series and the like.

Figure 1:
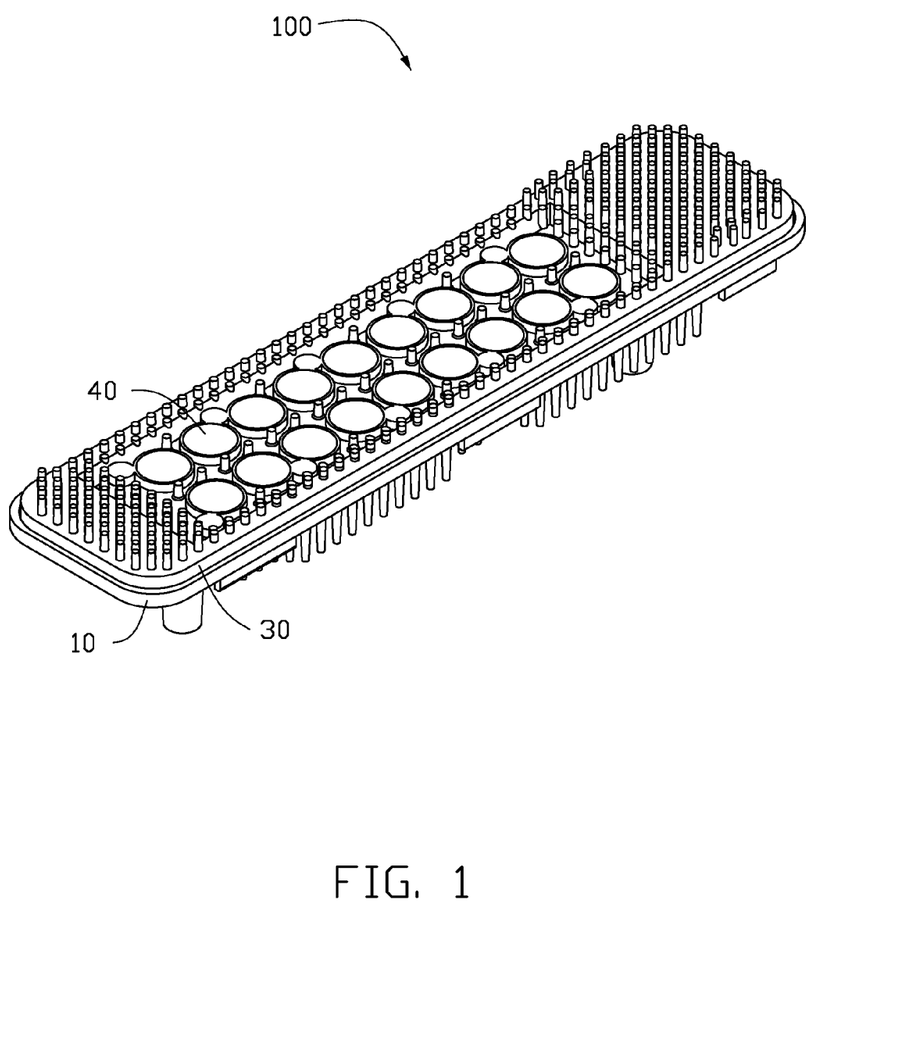
FIG. 1 is an isometric view of an LED street lamp according to an embodiment of this disclosure.

FIG. 1 illustrates that the LED street lamp 100 can include a base seat 10, a top housing 30, and a plurality of lenses 40 coupled to the top housing 30. The top housing 30 can be mounted on the base seat 10 and coupled to the base seat 10.

Figure 2:
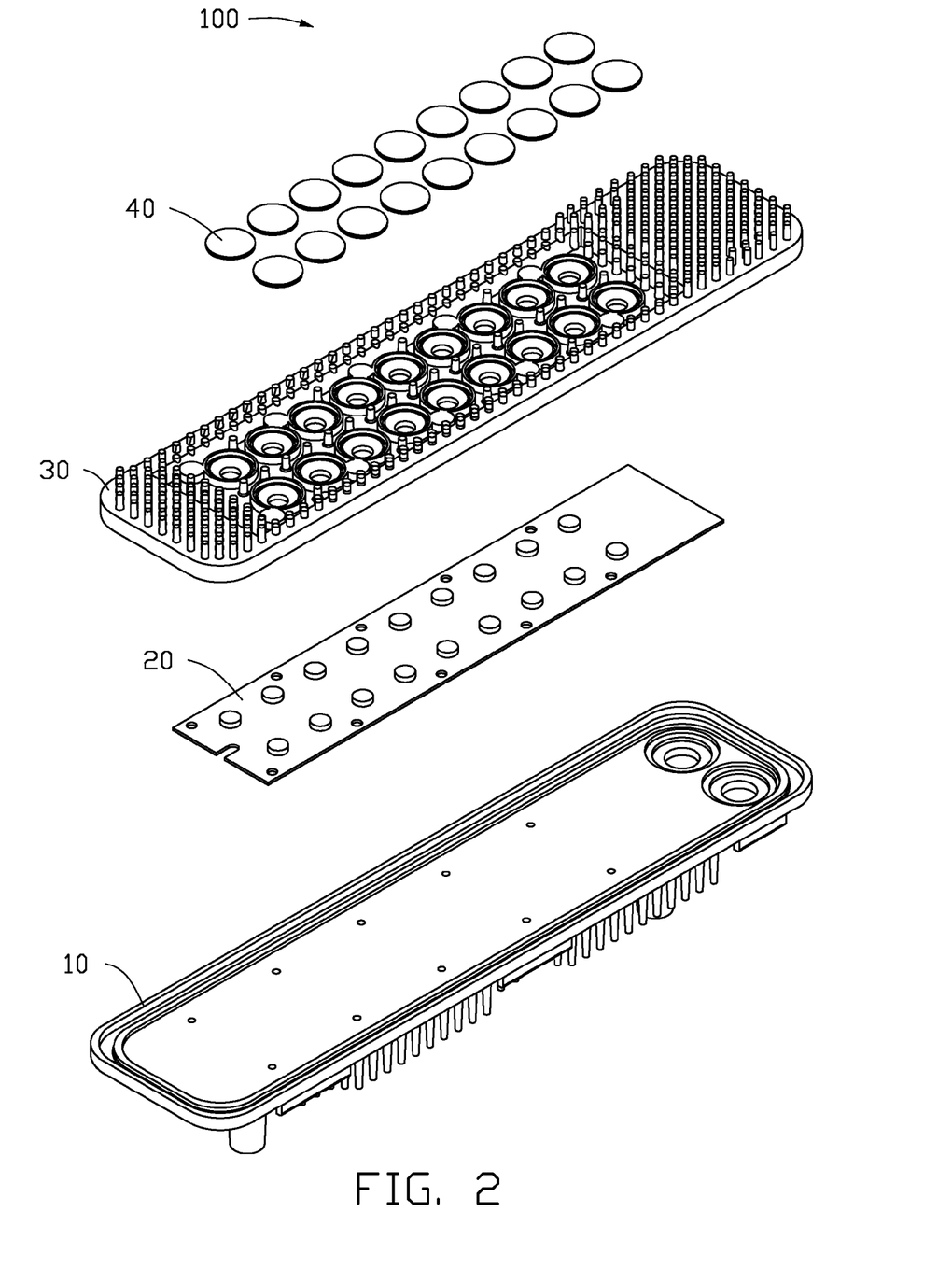
FIG. 2 is an exploded, isometric view of the LED street lamp as shown in FIG. 1.

FIG. 2 illustrates that the LED street lamp 100 can further include a lamp shade 20 sandwiched between the base seat 10 and the top housing 30. The lenses 40 can be disk-shaped. In other embodiments, the lenses 40 can be oval or other shapes. The lenses 40 can be made of polycarbonate, which has high ductility and good optical properties. In other embodiments, the lenses 40 can be made of other transparent materials or other transparent but colored materials, whereby the lenses 40 can have desirable optical properties and aesthetics.

Figure 3:
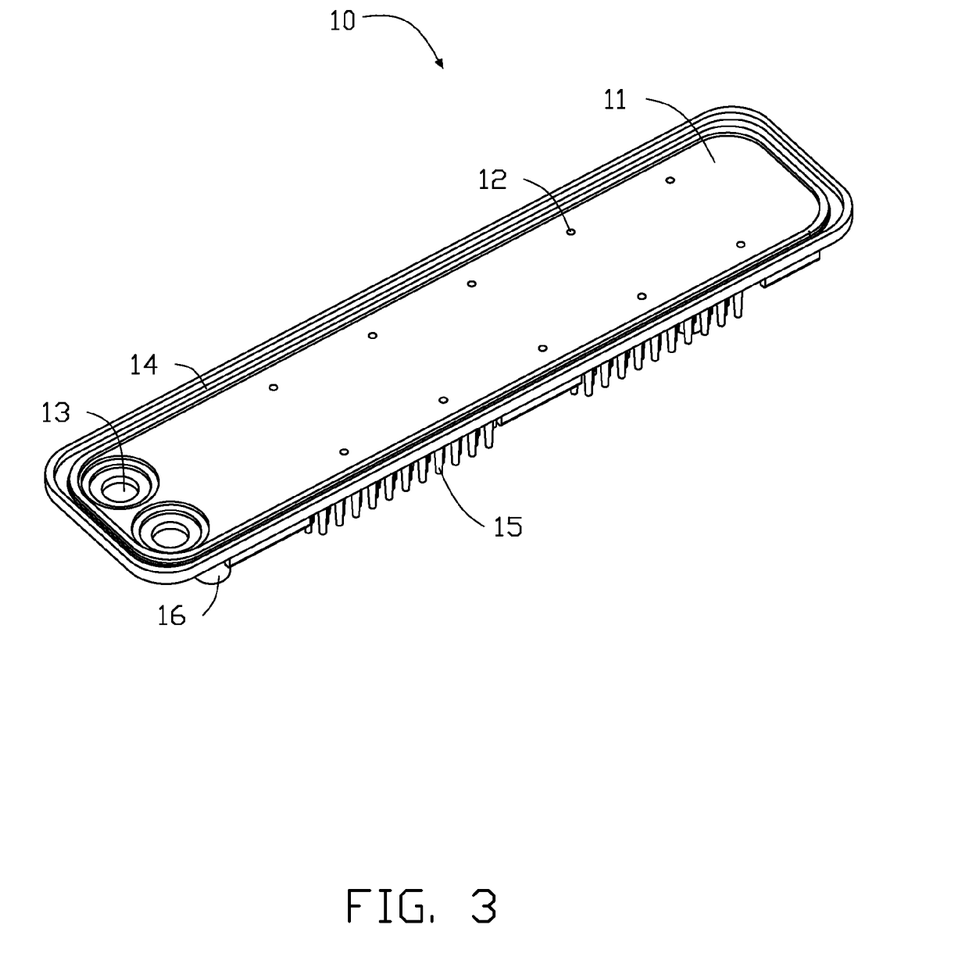
FIG. 3 is an isometric view of a base seat of the LED street lamp as shown in FIG. 1.

FIG. 3 illustrates that the base seat 10 can include a bottom plate 11, a plurality of threaded blind holes 12, two through holes 13; a peripheral groove 14, a plurality of first heat dissipation columns 15, and two assembly portions 16. The base seat 10 can be rectangular. The threaded blind holes 12 can be defined on one surface of the bottom plate 11 facing the light shade 20 (as shown in FIG. 2). Each of the threaded blind holes 12 can be recessed toward a surface of the bottom plate 11 away from the light shade 20 (as shown in FIG. 2). The two through holes 13 can be located on an end of the bottom plate 11 for receiving electrode leads (not shown). The peripheral groove 14 can be defined along the periphery of the bottom plate 11.

The threaded blind holes 12 can be substantially arranged in two parallel lines. In other embodiments, the threaded blind holes 12 can arranged in other ways. In at least one embodiment, the two through holes 13 can be substantially circular. The peripheral groove 14 can be a rectangular and closed groove for coupling with the top housing 30 (as shown in FIG. 2). In at least one embodiment, a sealing adhesive or a gasket (not shown) can be attached to an inner surface of the peripheral groove 14, so that the top housing 30 (as shown in FIG. 2) can be sealed when firmly coupled with the base seat 10 via the peripheral groove 14.

Figure 4:
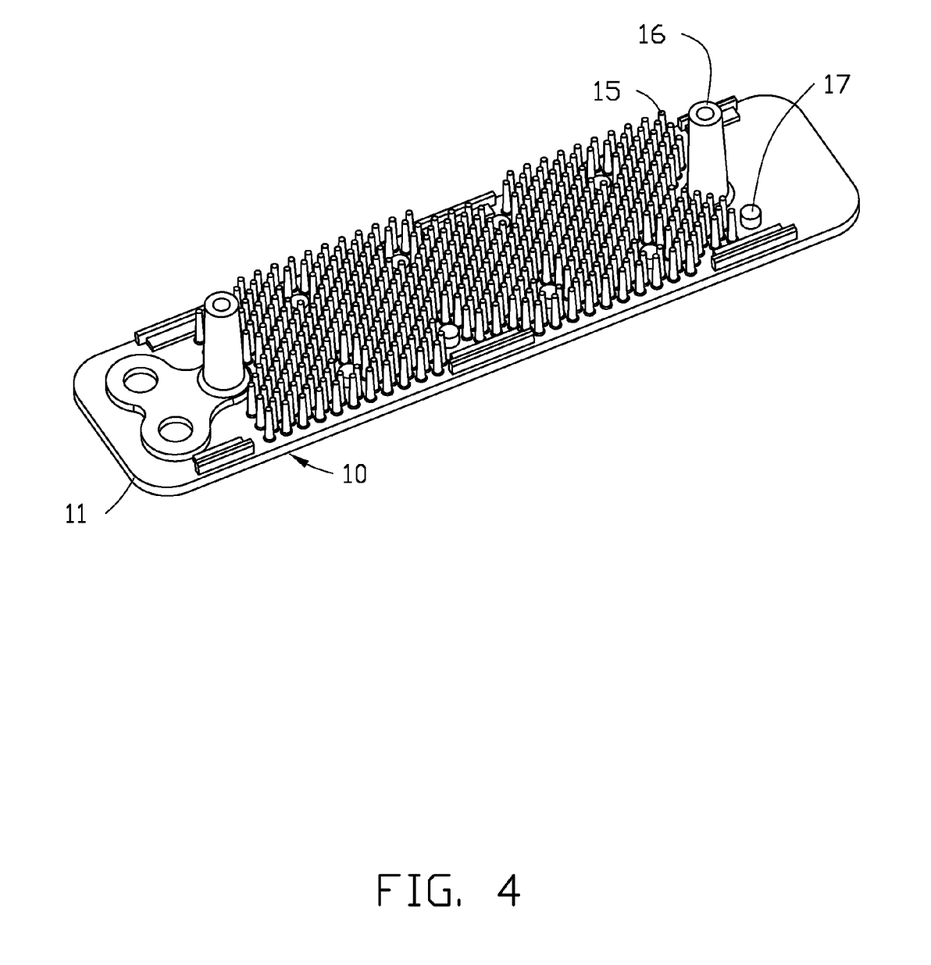
FIG. 4 is an isometric view of the base seat as shown in FIG. 3, from another perspective.

FIG. 4 illustrates another isometric view of the base seat 10. FIG. 4 illustrates that the first heat dissipation columns 15 and the two assembly portions 16 can be defined on the surface of the bottom plate 11 away from the light shade 20 (as shown in FIG. 2). In addition, the surface of the bottom plate 11 facing the light shade 20 (as shown in FIG. 2) can further define a plurality of receiving portions 17 extending away from the light shade 20 (as shown in FIG. 2).

The first heat dissipation columns 15 can be perpendicular to the bottom plate 11 to radiate the heat generated by the LED street lamp 100 (as shown in FIG. 1). In at least one embodiment, the first heat dissipation columns 15 can be integrally formed with the bottom plate 11. The first heat dissipation columns 15 and the base seat 10 can be made of a polyamide resin containing a graphite powder to improve weathering and ageing resistance. Furthermore, the first heat dissipation columns 15 can be cylindrical. The first heat dissipation columns 15 can be spaced from each other and arranged around the receiving portions 17 evenly, whereby the bottom plate 11 can efficiently and uniformly radiate the heat generated in the LED street lamp 100 (as shown in FIG. 1). An end of each first heat dissipation column 15 away from the bottom plate 11 can have a larger diameter than an end adjacent to the bottom plate 11. Thus, a heat dissipation area further away from the bottom plate 11 can be larger than a heat dissipation space adjacent to the bottom plate 11, whereby the heat exchange rate of the bottom plate 11 is high and the dissipation efficiency is increased.

The two assembly portions 16 can be hollow and cylindrical. The two assembly portions 16 can be located on an end of the bottom plate 11. The two assembly portions 16 can be substantially perpendicular to the bottom plate 11, for connecting to a pole (not shown). In other embodiments, more than two assembly portions 16 can be included. In addition, the surface of the bottom plate 11 facing the light shade 20 (as shown in FIG. 2) can be attached with a thermally conductive adhesive layer (not shown) made of a flexible plastic material or rubber, to improve the heat transfer efficiency. In at least one embodiment, the base seat 10 can be made of other thermally conductive materials.

The receiving portions 17 can be formed by recessing of the threaded blind holes 12 (as shown in FIG. 2) toward a surface of the bottom plate 11 away from the light shade 20 (as shown in FIG. 2). Screws (not shown), serving as fasteners can pass through the threaded blind holes 12 (as shown in FIG. 2) and be received in the receiving portions 17, whereby the base seat 10 can be strengthened.

Figure 5:
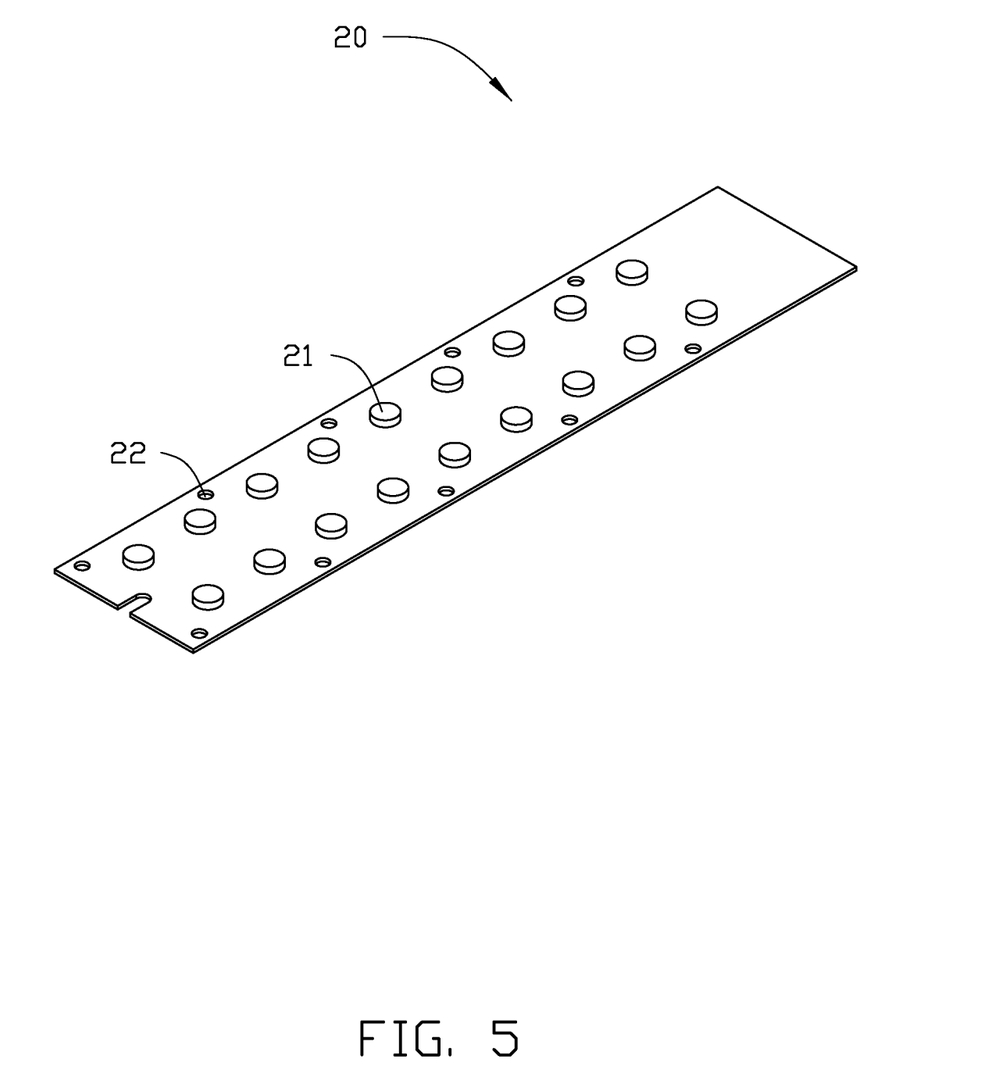
FIG. 5 is an isometric view of a lamp shade of the LED street lamp as shown in FIG. 2.

FIG. 5 illustrates that the lamp shade 20 can include a plurality of LED light sources 21 and a plurality of threaded holes 22. The LED light sources 21 can be arranged in two parallel lines. In at least one embodiment, the LED light sources 21 can be arranged in other arrays. The threaded holes 22 can be defined on the periphery of the lamp shade 20 and can be positioned to correspond to the threaded blind holes 12 (as shown in FIG. 3). The threaded holes 22 can be spaced from each other. A size and number of the threaded holes 22 can be matched with the threaded blind holes 12 (as shown in FIG. 3).

Figure 6:
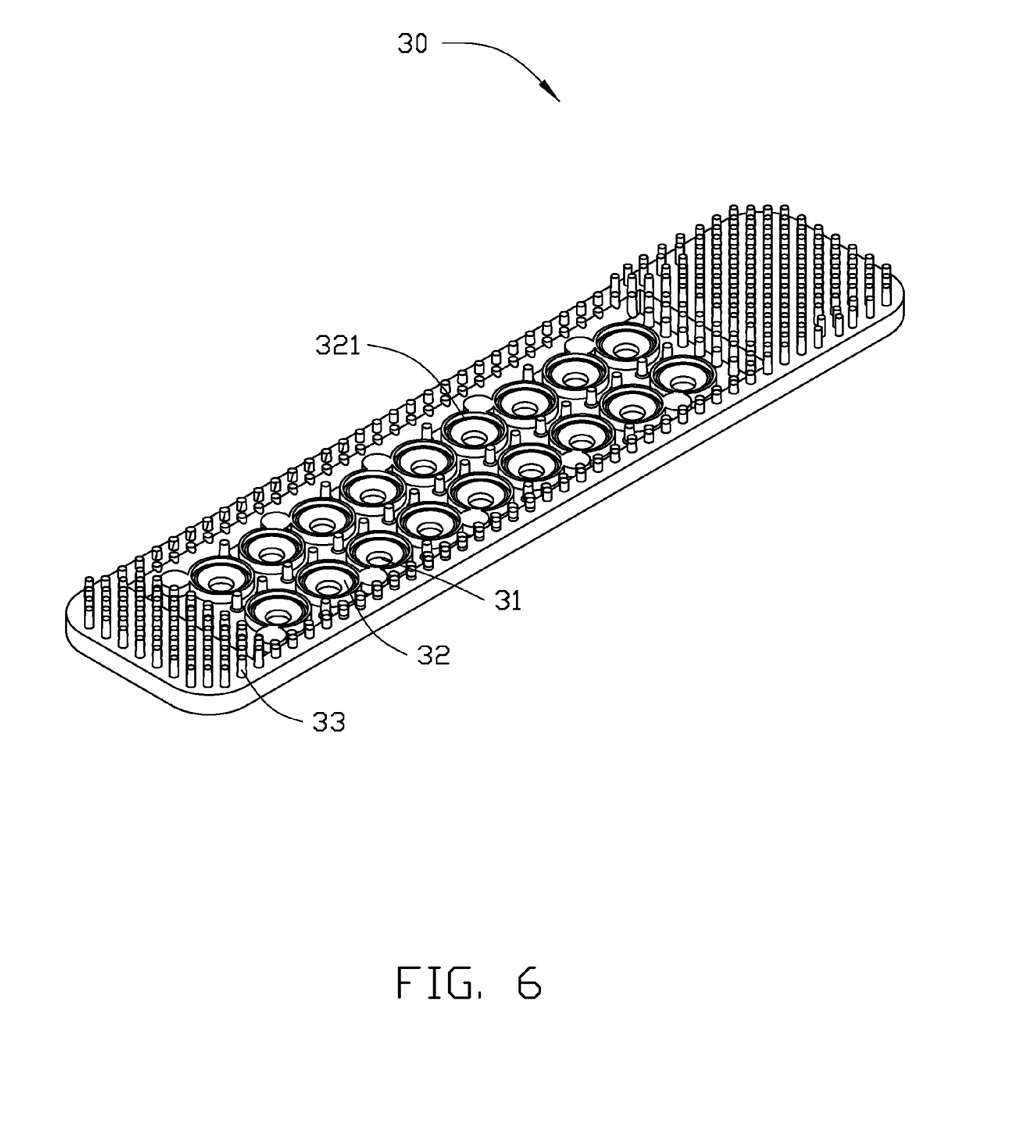
FIG. 6 is an isometric view of a top housing of the LED street lamp as shown in FIG. 2.

FIG. 6 illustrates that the top housing 30 can be rectangular. One surface of the top housing 30 away from the LED shade 20 (as shown in FIG. 2) can define a plurality of light transmission holes 31, a plurality of annular sidewalls 32, and a plurality of second heat dissipation columns 33.

The light transmission holes 31 can be defined to correspond to the LED light sources 21 (as shown in FIG. 5). Each annular sidewall 32 can form a closed tube and enclose each light transmission hole 31. Each light transmission hole 31 can be substantially circular. In other embodiments, the light transmission holes 31 can be oval or other shapes.

Each annular sidewall 32 can extend from the light transmission hole 31.

The annular sidewalls 32 can be funnel-shaped. An end of the each annular sidewall 32 away from the light transmission hole 31 can have a larger diameter than the light transmission hole 31, so that the heat generated in the LED street lamp 100 (as shown in FIG. 1) can be dissipated into a larger area. One end of the annular sidewall 32 extending away from each light transmission hole 31 can have an annular recessed portion 321 for receiving a sealing adhesive, whereby each lens 40 (as shown in FIG. 2) can be firmly fixed above the each light transmission hole 31. In at least one embodiment, the sidewalls 32 can be other shapes.

The second heat dissipation columns 33 can be positioned on the top housing 30. The second heat dissipation columns 33 can be arranged on a surface away from the lamp shade 20 (as shown in FIG. 2) in an array. The heat dissipation columns 33 can be positioned evenly around the annular sidewalls 32. The second heat dissipation columns 33 can be evenly spaced from each other. Therefore, the second heat dissipation columns 33 can efficiently and uniformly radiate the heat generated in the LED street lamp 100 (as shown in FIG. 1). The second heat dissipation columns 33 can be integrated with the top housing 30. The second heat dissipation columns 33 and the top housing 30 can be made of a polyamide resin containing a graphite powder, whereby the resistance to weathering and ageing of the top housing 30 can be improved.

Figure 7:
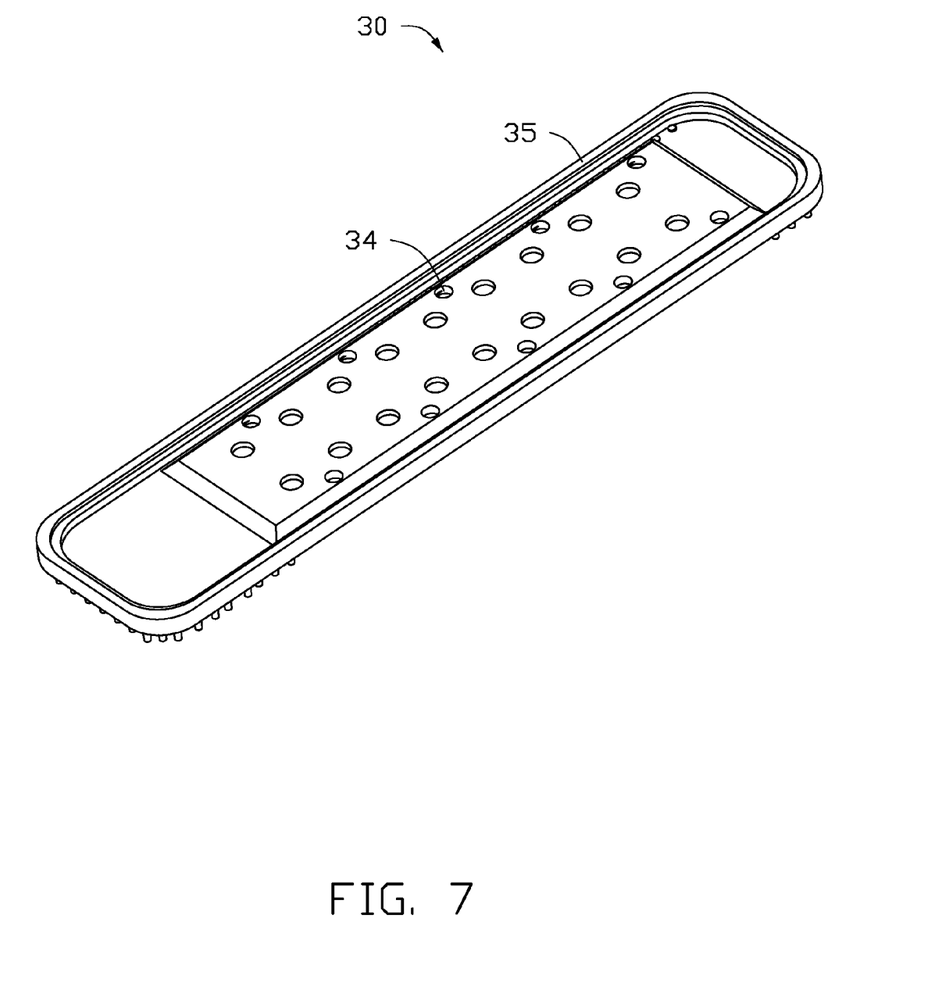
FIG. 7 is an isometric view of the top housing as shown in FIG. 6, from another perspective.

FIG. 7 illustrates that a surface of the top housing 30 facing the lamp shade 20 (as shown in FIG. 2) can define a plurality of protrusion portions 34. The protrusion portions 34 can be defined to protrude away from the lamp shade 20 (as shown in FIG. 2). Each protrusion portion 34 can be hollow and cylindrical. Each of the protrusion portions 34 can be defined to correspond to a threaded hole 22 (as shown in FIG. 5).

Figure 8:
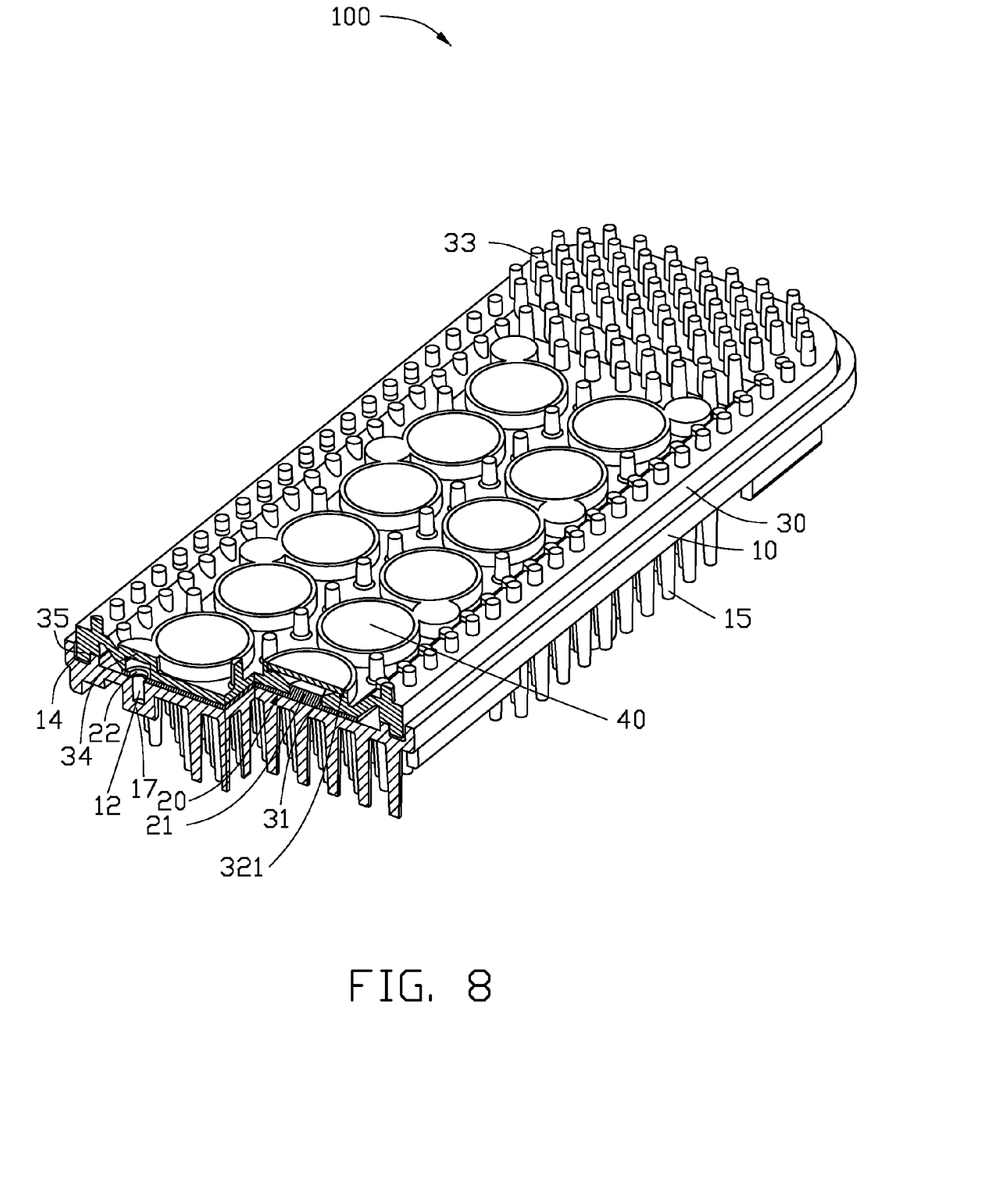
FIG. 8 is a perspective, cross-sectional view of the LED street lamp shown in FIG. 1.

FIG. 8 illustrates a cross-sectional view of the LED street lamp 100 (as shown in FIG. 1). Each protrusion portion 34 and each of the receiving portions 17 can cooperatively form a receiving space configured for receiving a screw (not shown) to improve the water-resistance and aesthetics. The peripheral projection 35 can be latched in the peripheral groove 14. Each of the LED light sources 21 can be positioned to correspond to a recessed portion 321. Each lens 40 can be fixed above a light transmission hole 31 via the annular recessed portion 321. Each LED light source 21 can extend out of the light through hole 31 and can be covered by a lens 40.

In assembly, first, the LED shade 20 can be installed on the base seat 10, the threaded blind holes 12 can be matched with the threaded holes 22, and each LED light source 21 can be positioned opposite to the base seat 10. At the same time, the screws (not shown) as fasteners can be passed through the threaded blind holes 12 and threaded holes 22. Thus, one end of each screw can be received in a receiving portion 17, and thereby the lamp shade 20 can be mounted on the base seat 10.

Then, the light through holes 31 can be positioned to correspond to the LED light sources 21 and each LED light source 21 can extend out of each light through hole 31. The other end of each screw (not shown) can be received in the protrusion portion 34, and the peripheral projection 35 can be latched in the peripheral groove 14. Thus, the top housing 30 can be mounted on the base seat 10 and the lamp shade 20 can be positioned between the base seat 10 and the top housing 30. Finally, each annular recessed portion 321 can be attached with sealing adhesive and a lens 40 positioned above the each LED light source 21 can be coupled with each annular sidewall 32 via each annular recessed portion 321. Assembly of the LED light street lamp 100 can thereby be completed.

As the base seat 10 can include a plurality of first heat dissipation columns 15, and the top housing 30 can include a plurality of second heat dissipation columns 33, the base seat 10 and the top housing 30 can be used to dissipate heat and the LED street light 100 can have great heat radiation efficiency. In addition, the plurality of first heat dissipation columns 15 can be integrally formed with the base seat 10 and the plurality of second heat dissipation columns 33 can be integrally formed with the top housing 30, the LED street light 100 can therefore have a lower production cost and be lighter and more simply formed. Each protrusion portion 34 and each receiving portion 17 can cooperatively form a receiving space to receive a screw, whereby the LED street light 100 can have good water-resisting properties.

The embodiments shown and described above are only examples. Many details are often found in the art such as the other features of an LED street lamp. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An LED street lamp comprising:
   a base seat comprising a plurality of first heat dissipation columns integrated with the base seat;
   a lamp shade mounted on the base seat;
   a plurality of LED light sources are positioned on the lamp shade; and
   a top housing coupled to the base seat, the top housing comprises a plurality of second heat dissipation columns integrated with the top housing;
   wherein the base seat, the first heat dissipation columns, the top housing, and the second heat dissipation columns are made of a polyamide resin containing a graphite powder.

2. The LED street lamp as claimed in claim 1, wherein the base seat comprises:
   a bottom plate; and
   a plurality of threaded blind holes positioned on one surface of the bottom plate facing the light shade;
   wherein each of the plurality of threaded blind holes is recessed toward a surface of the bottom plate away from the light shade to form a receiving portion extending away from the light shade.

3. The LED street lamp as claimed in claim 2, wherein:
   the lamp shade comprises a plurality of threaded holes corresponding to the threaded blind holes;
   the top housing includes a plurality of hollow protrusion portions protruding away from the lamp shade; and
   the protrusion portions are matched with the threaded holes.

4. The LED street lamp as claimed in claim 1, wherein the first heat dissipation columns are cylinder shaped.

5. The LED street lamp as claimed in claim 1, wherein one end of each of the first heat dissipation columns away from the base seat has a larger diameter than the other end adjacent to the bottom plate.

6. The LED street lamp as claimed in claim 1, wherein the first heat dissipation columns are substantially perpendicular to the base seat.

7. The LED street lamp as claimed in claim 1, wherein the second heat dissipation columns are substantially perpendicular to the top housing.

8. The LED street lamp as claimed in claim 1, wherein the first heat dissipation columns are evenly spaced from each other.

9. The LED street lamp as claimed in claim 1, wherein the second heat dissipation columns are evenly spaced from each other.

10. The LED street lamp as claimed in claim 1, wherein the top housing comprises:
    a plurality of light transmission holes corresponding to the LED light sources; and
    a plurality of annular sidewalls extend from the light transmission holes;
    wherein each of the annular sidewalls correspondingly encloses one of the light transmission holes.

11. The LED street lamp as claimed in claim 10, wherein one end of each annular sidewalls away from the light transmission hole defines an annular recessed portion.

12. The LED street lamp as claimed in claim 11, wherein an end of each of the annular sidewalls away from the light transmission hole is larger than each of the light transmission holes.

13. The LED street lamp as claimed in claim 10, wherein the LED street lamp further comprises a plurality of lenses, and each of the lenses is correspondingly coupled to one of the annular sidewalls.

14. The LED street lamp as claimed in claim 1, wherein the LED street lamp further comprises a peripheral groove positioned along the periphery of the base seat.

15. The LED street lamp as claimed in claim 14, wherein the LED street lamp further comprises a peripheral projection positioned along the periphery of the top housing and latched in the peripheral groove.

* * * * *